United States Patent
Platzer (10) Patent No.: US 9,519,873 B2
(45) Date of Patent: Dec. 13, 2016

(54) SYSTEM AND METHOD FOR WIDESPREAD LOW COST ORBITAL SATELLITE ACCESS

(71) Applicant: SPIRE GLOBAL, INC., San Francisco, CA (US)

(72) Inventor: Peter Platzer, Mountain View, CA (US)

(73) Assignee: SPIRE GLOBAL, INC., San Francisco, CA (US)

( * ) Notice: Subject to any disclaimer, the term of this patent is extended or adjusted under 35 U.S.C. 154(b) by 665 days.

(21) Appl. No.: 13/757,062

(22) Filed: Feb. 1, 2013

(65) Prior Publication Data
US 2014/0222472 A1    Aug. 7, 2014

(51) Int. Cl.
*G06Q 10/02* (2012.01)

(52) U.S. Cl.
CPC ..................... *G06Q 10/02* (2013.01)

(58) Field of Classification Search
CPC .................................................... G06Q 10/02
USPC .................................... 701/2; 705/5
See application file for complete search history.

(56) References Cited

U.S. PATENT DOCUMENTS

| | | | |
|---|---|---|---|
| 5,940,739 A * | 8/1999 | Conrad et al. | 455/13.1 |
| 5,963,166 A | 10/1999 | Kamel | |
| 6,067,453 A * | 5/2000 | Adiwoso et al. | 455/430 |
| 6,271,877 B1 * | 8/2001 | LeCompte | 348/144 |
| 6,381,228 B1 * | 4/2002 | Prieto, Jr. | H04B 7/18582 370/323 |
| 6,584,452 B1 | 6/2003 | Prieto, Jr. et al. | |
| 2003/0217362 A1 * | 11/2003 | Summers et al. | 725/63 |
| 2004/0263386 A1 | 12/2004 | King et al. | |
| 2007/0182628 A1 | 8/2007 | Pomerantz et al. | |
| 2008/0071633 A1 | 3/2008 | Ozkan et al. | |
| 2009/0007240 A1 * | 1/2009 | Vantalon et al. | 726/4 |
| 2012/0018585 A1 | 1/2012 | Liu et al. | |
| 2013/0018529 A1 | 1/2013 | Ploschnitznig | |

FOREIGN PATENT DOCUMENTS

EP        EP 1037405 A2 *    9/2000    ......... H04B 7/2121

* cited by examiner

*Primary Examiner* — Mussa A Shaawat
*Assistant Examiner* — Abdhesh Jha
(74) *Attorney, Agent, or Firm* — Troutman Sanders LLP (57) ABSTRACT

A satellite support and administration system includes a web based portal to allow widespread user access to advanced satellite technology at extremely low costs. The system supports the sequential launch of increasingly sophisticated satellites having limited life spans. Each satellite is equipped with a powerful array of sensors for space based measurement of scientifically and commercially important phenomena. A ground based platform supports and encourages the development of software and custom applications to operate experiments utilizing the processors and sensor array on the satellite.

5 Claims, 5 Drawing Sheets

SYSTEM AND METHOD FOR WIDESPREAD LOW COST ORBITAL SATELLITE ACCESS

The present invention relates to a system and process for implementing high volume low cost distributed access and control of select satellite operations. In particular, the present invention relates to providing a launch and operations architecture for orbital satellites that permits widespread distribution of satellite access services, including but not limited to satellite images, data and video, at a cost and pricing structure that greatly expands the population of potential user and uses.

BACKGROUND

Space in many ways is truly the final frontier. This is particularly true for those searching for new markets and business opportunities in select commercial operations. Space is not only one of the last truly new markets, but one of the most difficult to commercially exploit as the road to successful commercial space based enterprises is littered with failed endeavors and enterprises. While access and indeed travel to space is now many decades old, there are but a few systematic approaches to commercial operations in space. Indeed, beyond telecommunications there are very limited commercial efforts in space.

The past growth of satellite use in space has followed a path that actually retards the exploitation of this market. In particular, satellite technology has focused on developing large payloads and expensive launch equipment designed to last long periods of times—over a decade in some instances. This is based in part on the cost of building and launching a satellite which is easily in the millions of dollars and thus must be amortized over many years of life. This however creates a serious barrier to commercial exploitation as most satellites are based on computer and telecommunication technologies that are changing rapidly—and this rate of change is accelerating. A satellite launched five years ago is using technology that may be three generations out of date, leaving a platform that is quickly becoming obsolete.

SUMMARY AND OBJECTS OF THE INVENTION

It is therefore an object of the present invention to provide a platform for operating a commercial satellite access service that is both affordable and valuable to a wide audience of users.

It is also an object of the present invention to provide a commercial satellite access service to multiple users, for example by subscription, via a web based interface that permits limited but direct control over select satellite operations.

It is also an object of the present invention to provide a commercial satellite access service to multiple users, for example by subscription, via a web based interface that permits access to satellite telemetry data and sensor readings, including visual and multi-spectral images and video.

It is a further object of the present invention to provide a market pricing clearinghouse for allocating limited access time and for distributing the use of satellite and other spaced based platforms.

It is yet another object of the present invention to provide a satellite access protocol based on the launch of relatively inexpensive satellites having a relatively short expected useful lifespan, so that over time, successive generations of technology are placed in sequential launches to provide an evolving and advancing technological platform during the extended operation of the system.

It is still another object of the present invention to provide a protocol for managing access to multiple concurrently orbiting satellites to support applications that implement operations that require use of more than a single satellite at one time.

It is another object of the present invention to provide a ground based server that is connected to a multi-access network and in communication with one or more satellites so that users on the network can interact with the satellite(s) and in particular, instrumentation located on board the satellite(s).

It is another object of the present invention to provide a ground based market place to facilitate reservation of satellite access time in an open architecture system. Optionally, the system will permit the auction of satellite access time slots for high value events such as photographic access to the Super Bowl; or select access to on-board instruments during rare space events, such as solar events, celestial events (for example, eclipses), asteroid events, etc.

It is still a further object of the present invention to provide an open source platform to allow users to develop programs and applications that are based on selected standards and to facilitate upload and operation of these applications onboard an orbiting satellite or satellite constellation for implementing one or more functions thereon.

It is still a further object of the present invention to provide an open source platform to allow users to develop programs and applications that utilize satellite telemetry or sensor data, including images and video, and process this data remotely from the satellite; for example, in a cloud-based computing system, mobile device, or any other computing system. Optionally, such programs may be distributed and/or sold to other satellite users in a clearinghouse or online store.

Many of the above and other objects of the present invention are realized in an illustrative multi-faceted, computer implemented commercial satellite access enterprise. This enterprise may include a satellite launch sequence protocol that provides the scheduled launching of small, relatively inexpensive satellite payloads each comprising computer, sensor, camera and communication modules of state-of-the-art design. Use of state-of-the-art components in the satellite design insures that the ultimate capabilities of the active array of satellites in orbit at any one time allow for user access to current or relatively current technology.

In a further aspect of the present invention, the satellite includes a programmable computer connected to an array of sensors and peripheral devices. The onboard microprocessor is designed to allow for operation of one or more applications designed by users and implemented in space in accordance with user selected objectives; for example, a user application may assist the user in conducting experiments using the onboard sensors, and record data for transmission back to the user. Further examples include one or more user implemented programs that (i) task the satellite(s) to track and record weather and climate related data or (ii) operate to collect data and images that allow insight into the economic activity of a region or country, such as the current state of its agriculture industry.

In another aspect of the present invention, the administrative system monitors key components to the launch payload and updates the parts database so that the system architecture is an evolving design incorporating new and advanced parts as they are released from the suppliers. As the satellite manufacturing cycle progresses, each new vehicle's assembled parts will include many of the latest components.

In one embodiment of the present invention, the administrative system may coordinate the utilization of different parts or components on different satellites during operations. For example, the administrative system may allow a user running an experiment requiring component x and component y to use the latest component x located on satellite 1 in conjunction with the latest component y located on satellite 2.

In yet another aspect of the present invention, the administrative system maintains near continuous communications with orbiting satellites allowing for monitoring of on-board systems and for sending control signals and for receiving data from these on-board systems. Preferably these communications are handled through a dedicated link under the direct supervisory control of the administrative system. Alternatively, communications may be leased from one or more contract satellite link operations to support some or all of these satellite communications.

DETAILED DESCRIPTION OF THE PREFERRED EMBODIMENTS

The present invention is directed to an infrastructure and operational protocol that permits widespread access to space based satellite operations. There are three main aspects of the present invention from a systems standpoint. First, the satellite or satellite array that is in operation after launch. The satellite, in one embodiment, is based on an industry standard, developed in 2001 by Stanford University and California Polytechnic Institute. The standard is called CubeSat and described in the document "CubeSat Design Specification"[1]. The size and sophistication of the satellite is such that it fits the overall design and objectives of the operative platform used to support it. In this illustration, the size of the satellite is relatively small, in general not exceeding 10 cm×10 cm×30 cm and 10 kg of mass, and the design includes around 25 separate sensors connected to and in communication with the central processing unit of the satellite. These sensors include a plurality of frequency specific monitors such as UV (Ultraviolet) and IR (infrared); other sensors are for remote detection of surface temperature; spectroscopy and one or more accelerometers; other onboard tools include camera/vision systems for still and video capture.

[1] Available at http://www.cubesat.org/images/developers/cds_rev12.pdf

Figure 1:
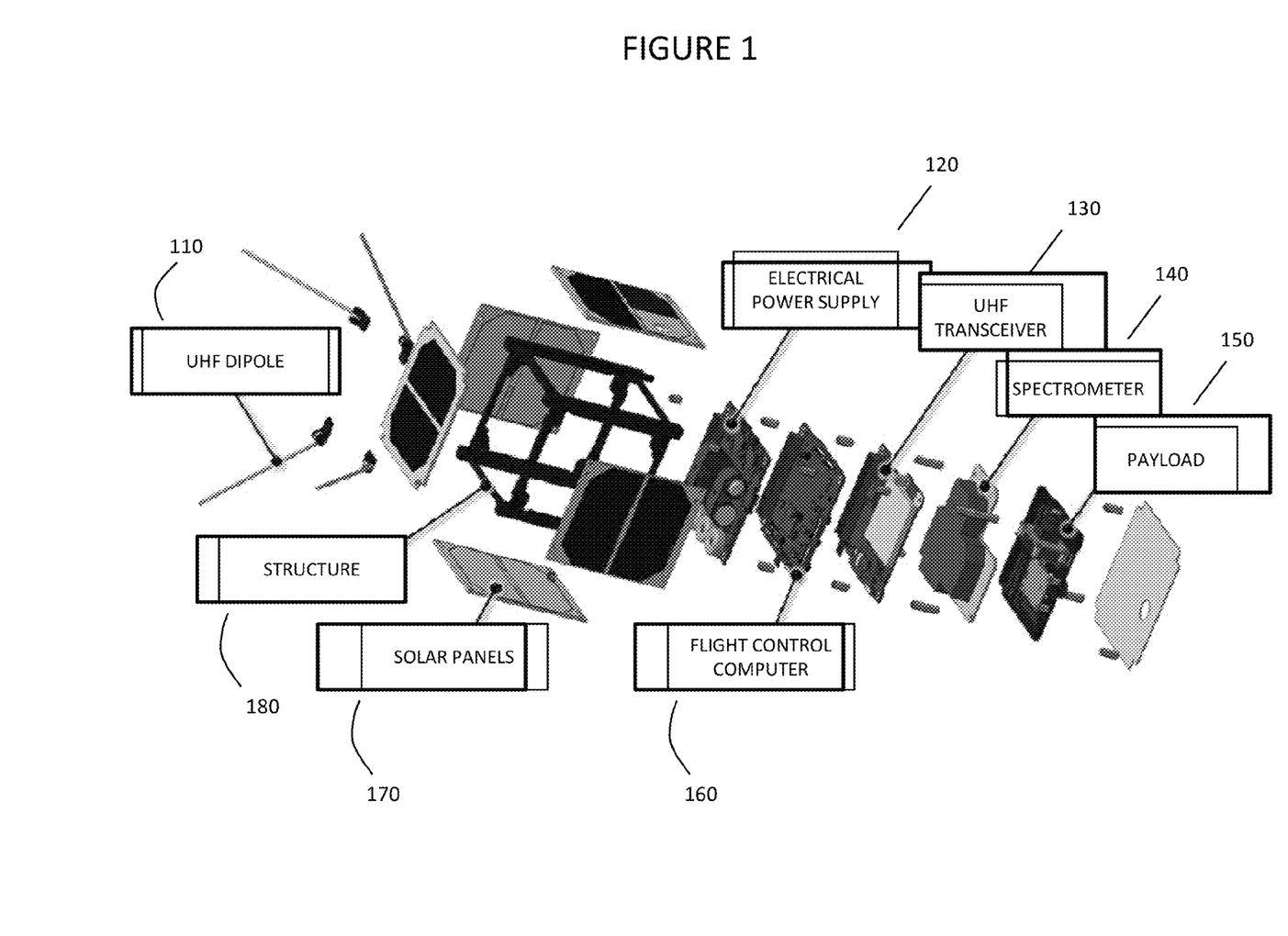
FIG. 1 is a schematic diagram depicting the salient features of a illustrative satellite in accordance with the present invention.

FIG. 1 provides a simplified illustration of a compatible satellite for the foregoing system. Beginning with framing structure 180, the satellite includes a framework for housing the various subassemblies. Five separate solar panels 170 are used to provide the exterior facing walls that define the interior of the satellite; and positioned to continually expose one or more of the surfaces to solar energy during operation. These panels convert solar emissions into electrical power and are connected to power module 120 comprising energy storage and power control circuits. The power module 120, in addition to storing the solar energy, drives and powers all the operative systems within the confines of the satellite.

Continuing with FIG. 1, the satellite further comprises ultra high frequency dipole antenna (UHF) forming an array of four separate antenna rods 110. The antenna array is connected to a UHF Transceiver 30, configured to manage and implement all incoming and outgoing communications to the satellite. To complete the assembly, the satellite further includes a flight control computer 160 that manages aspects of flight including deployment and orientation. A spectrometer module 140 is positioned next to the flight control computer, and a final payload 150 is included. The payload is often mission specific and can be altered between launches depending on the current needs/offerings to the market.

The payload captures a further, preferred embodiment of the invention. In particular, the payload will change with each launch, embracing an increasingly sophisticated collection of sensors and computer processing power. In addition to advancing the technology in each successive launch, the payload may vary among launches depending on and directed to different missions. For example, the sensors included for a launch may be custom to the orbital path for the satellite(s), with polar orbits equipped differently than equator orbits. Another example involves supporting processing/operations that employ two or more satellites concurrently. This may occur for an application that needs concurrent readings from two perspectives—such as two photos of a storm. To support this, it may be that one payload is the "master" and a second (and perhaps third) are "slaves." Alternatively, the "master" may reside on the ground control station, and each satellite is a "slave."

The computer platform in the payload includes one or more microprocessors for implementing user and administrator in-orbit-configurable logic governing programs. This includes in a preferred arrangement, onboard resident programs for implementing a host of permanent functions that are expected to be useful and used for the life of the satellite (typically one year) as well as programs uploaded by users and/or administrators while the satellite(s) is(are) in orbit. These programs govern the operation of the onboard systems in the satellite(s) including all communications, sensor management, diagnostics, maintenance, memory management and select operating system features and functions. Included within this software package design is an open source platform that permits implementation of applications optionally designed by third party users and a user community of the satellite(s). Platform resources may be open source or proprietary depending on the nature of the business model being pursued.

The microprocessor is further connected to or integrated with application memory for storing programs that can be uploaded to the satellite via the communication link discussed in more detail below. Depending on the operational approach and application, the platform, structure and syntax for said programs will vary from very open source (e.g. Arduino IDE) to more closed systems (e.g. the Apple iOS system) that ensure safe operation. In any case however, the structure of the platform is such that it allows for easy and widespread innovation in the global development and user community.

As noted earlier, the satellite includes a portfolio of sensors and imaging devices (camera or video). The technology for these components is rapidly advancing and individual hardware will become relatively obsolete within a couple of years. As new generations of satellites are prepared for launch, they will be equipped with state-of-the-art sensors and support software (applications and operating systems) that is also evolving to accommodate the more modern components. For example, camera resolution and performance may double every six to twelve months. As the satellite design progresses to include state-of-the-art camera designs, the software must also be updated so as to support applications that implement camera operations. Software upgrades, in certain embodiments, can be done remotely while the satellite is in orbit. In certain embodiments, one or more satellites will be replaced with an updated satellite every 6-24 months. In preferred embodiments, one or more satellites will be replaced with an updated satellite every 12-18 months.

Figure 2:
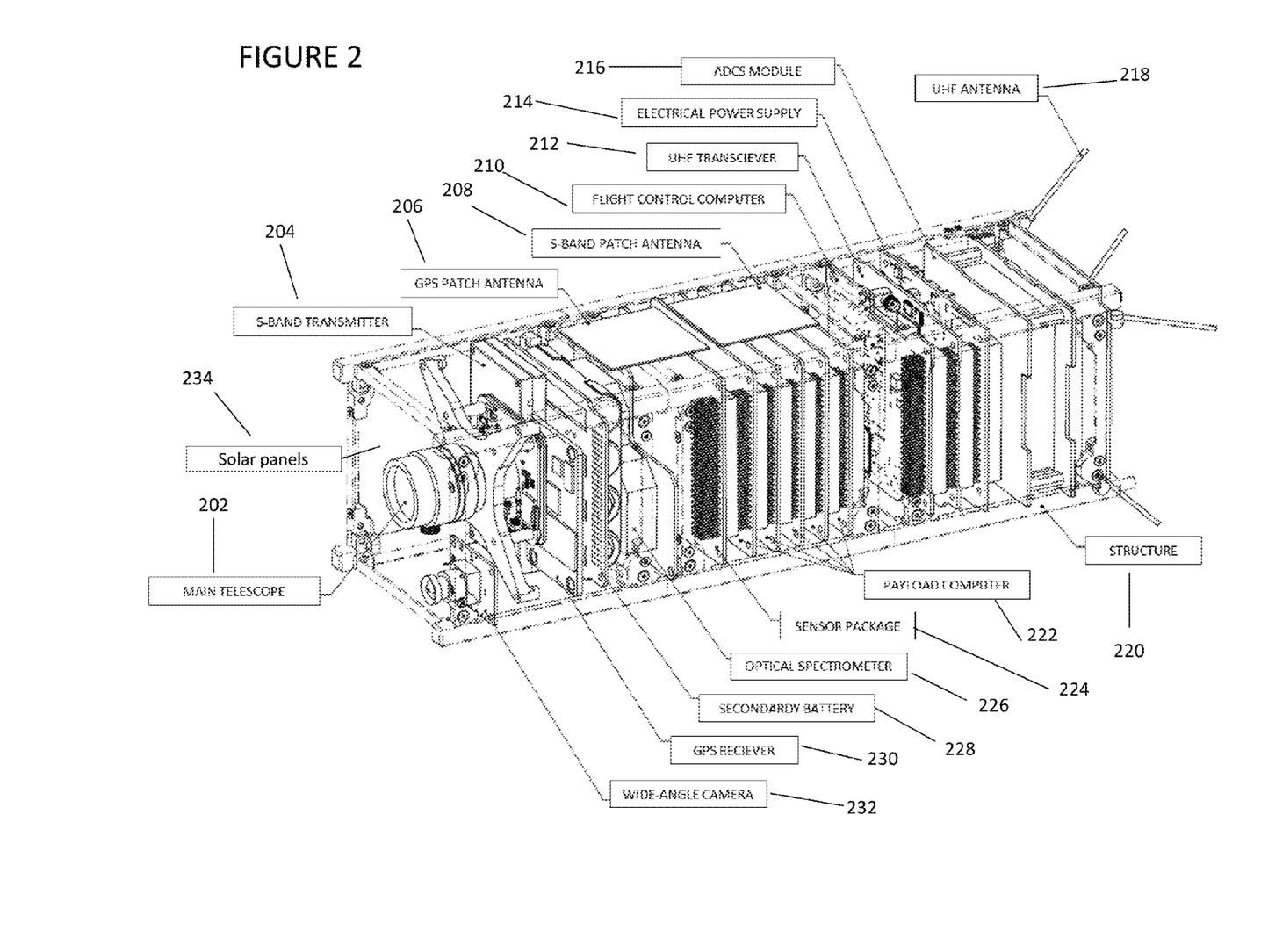
FIG. 2 is a second launch vehicle in accordance with the present invention.

A second satellite is depicted in FIG. 2. In this figure, the satellite is presented in more detail but includes many features in common with FIG. 1. Moving from left to right, the arrangement includes a main telescope 202 and an array of solar panels 234. Next, an S-band transmitter 204 begins the instrument stack. Continuing GPS patch antenna 206 and S-band patch antenna 208 are vertically placed in the satellite.

Turning now to the right hand side of the FIG. 2, the linear stack includes flight control computer 210 and UHF transceiver 212. This is followed by the power supply 214 and ADCS module 216. The right hand surface of the satellite includes antenna array 218, supporting UHF communications. Continued in structure 220 are the individual boards forming the payload computer 222. Continuing along the lower edge, sensor package 224, optical spectrometer 226 and secondary battery 228 are arranged in series. Finally, this stack is topped by the GPS receiver 230 and wide-angle camera 232.

Figure 3:
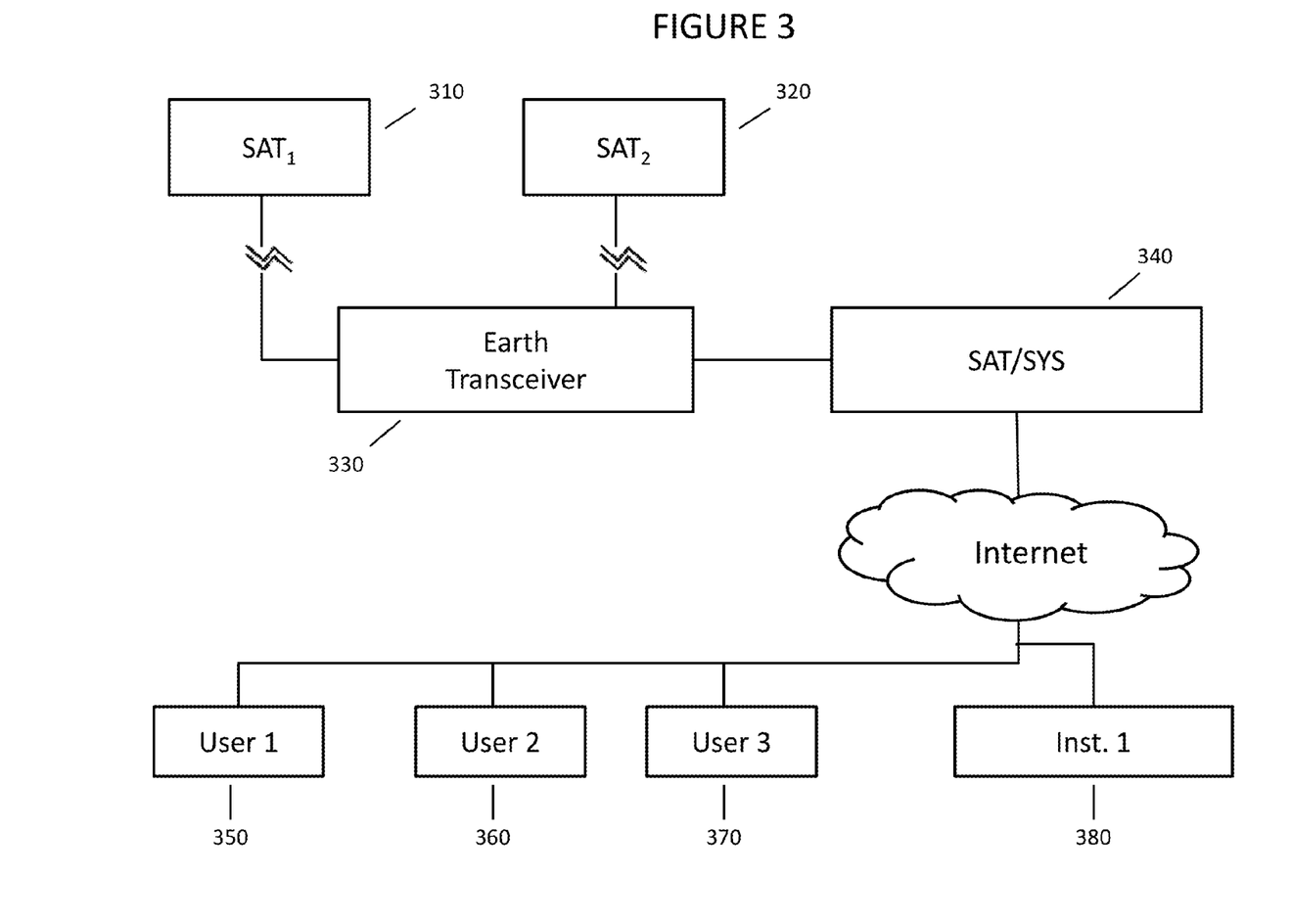
FIG. 3 is a functional block diagram of an illustrative arrangement used to implement the present invention.

Turning now to FIG. 3, the operative system design for the preferred embodiment is provided in functional or block diagram form. Space based hardware consists of one or more orbiting satellites corresponding in general terms to the design provided in FIG. 1. As reflected in FIG. 3, two satellites are orbiting, each with a communication link via UHF transceiver, to a ground station. These satellites are marked 310 and 320 respectively. The remaining hardware resides on the earth, including a ground UHF transceiver station 330. Depending on the complexity sought and the number of satellites in orbit, additional ground based communication stations may be used, and different communication protocols other than UHF may be employed.

Continuing with FIG. 3, the ground based communication station 330 is linked to a system operations server 340. The SAT/SYS operation server provides the operative computer platform controlling access to and communications from the satellites. Typically, but not shown in the diagram, is the supporting database (conventional, e.g., Oracle, or custom) and other server/network systems (Apache) required to implement the business operations of the service. In addition, SAT/SYS Server is programmed to manage and implement the business operations supporting the satellite operations.

Figure 4:
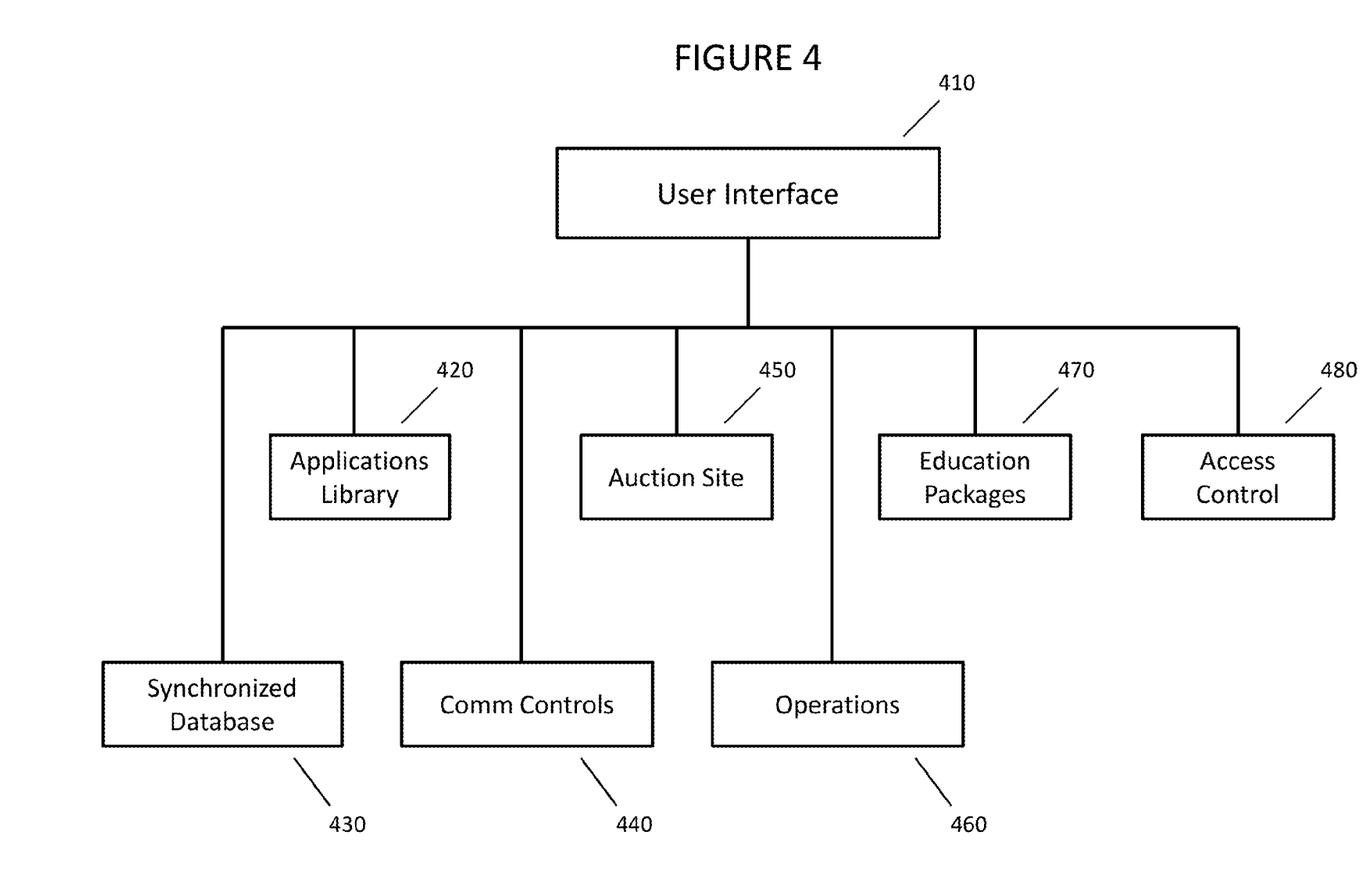
FIG. 4 is a further block diagram of the SAT/SYS server as used in the preferred embodiment of the present invention.

The operative features of the preferred embodiment of SAT/SYS Server 340 are presented in more detail in FIG. 4, infra. The SAT/SYS Server 340 is connected to the Internet to allow for conventional access to the Web in accordance with the well-known communication protocols of the Web (e.g., TCP/IP). This communication extends to a community of service subscribers, indicated in the diagram as Users 1, 2, and 3 each with links to the SAT/SYS Server via the Internet. For ease of exposition, these users are separately and respectively marked as User 350, User 360 and User 370. Finally, an institutional server 380 is depicted reflecting a broader based subscriber, such as a school, that connects via the Internet but internally manages access—such as by an intranet.

In yet another aspect of the present invention, the system spatially and temporally synchronizes data and images collected from one or many satellites and provides for an easy access interface for users to said synchronized data. The synchronization involves a synchronization protocol and algorithm to permit fast and accurate data collection and storage in a database. For example, a constellation of 20 satellites can record 20 times as often data from one spot on earth (higher temporal resolution) or simultaneously record measurements at 20 locations on earth (higher spatial resolution). In this multi-faceted arrangement, the data collected is collected individually from each source (satellites) but stored with them and time and location (and orientation) data so as to provide spatial and temporal synchronization in a manner that retains the full value of the collected information.

The operative web portal for the satellite service will include a number of features to assist in distributing satellite access time. Typically, the system will be subscription based, where users will sign up, with appropriate security safeguards and privacy software in place. A public access portal may be included for browsing and to permit marketing efforts for the system administrator to build demand. In the subscription only area, web pages will provide multiple levels of system access. For the users actually allotted time to a satellite, the web portal will provide, for example, a window into the current operation of the satellite, including tracking information, and select output from sensors as well as the ability to upload their own application or code to task all or part of the satellite and payload functions. For the users which have purchased or received access to all or parts of the data collected, their access will allow them to receive and potentially download data from the spatially and temporally synchronized database.

In one arrangement, the system supports two levels of access. The first or entry level is general telemetry or operating data decoupled from any particular test or analysis. This would include position, speed, temperature and other environmental/demographic data that is streamed or sent in data dumps (batch mode) from the satellite. For example, a landing screen display may include real-time images sent from one or more of the orbiting satellites and/or graphs of current measurements or readings. The second tier of access is more custom and involves the implementation of a user developed protocol or algorithm (via controlling software or firmware application). This second form of access is also supported on the web portal, but may have greater restrictions, based on the commercial nature of the study.

For example, a user may develop an open source storm tracking program that operates onboard the satellite for a select window of time. The program receives inputs from ground control regarding a storm that is forming and/or moving across the Atlantic towards Bermuda. Once the target directional data is uploaded, the program operates the onboard camera systems and other sensors to collect images and temperature data for the storm being tracked. As the information is being collected, a second ground based application is receiving and interpreting the data and preparing output formats for user review of the test results. A second tier subscription user may be able to upload and run this tracking program on the satellite, and receive access to the related data. In one embodiment, the programs designed to run on the satellite, such as the tracking program, may be sold on and purchased from a clearinghouse or online application store. In another embodiment, a user might get access to not only the spatially and temporally synchronized raw-data set but also some further analytics on top of the raw-data. For example, in the above sketched scenario, the user might get access to the raw images tracking the storm but also regularly (and potentially in real-time) updated prediction of the future track of the storm and expected landfall, estimated damages caused, economic impact, etc.

The foregoing arrangement discusses a user-prepared program that conforms to select Open Source requirements for this application. In addition to user-designed applications, the system includes a library of "canned" applications developed by the system administrator. In addition, a user community supplements this library, offering programs that can operate alone to implement one or more experiments of general user interest, or act as building blocks to build more sophisticated and/or special purpose programs. For example, as users build their own applications, these can be added to the library for later use by others under terms to be administered by the system administrator. In one arrangement, the library of applications can be converted into a marketplace, where tested applications may be sold to current and potential users of satellite access time. Applications may be sold only upon approval of the system administrator based on stored criteria for commercial release.

As demand grows for satellite test/access time slots, a further aspect of the illustrative system is an auction site for time slots using bid/ask spreads to develop market pricing for satellite access. Certain time slots may be more valuable due to certain space, atmospheric or ground events. For example, a major event such as a large weather pattern, storm, volcano or tsunami will create exceptional short term demand for time slots and orbital paths that bring the event within the reach of the satellite sensors. Appropriate tools for pricing these slots and allowing purchasers to resell are provided on the SAT/SYS Server.

As discussed above, a major market for satellite access time exists within the science departments and the science curriculum of most schools and universities—particularly in the grade 7-12 age groups and for undergrad programs. Platform access time and programming for targeted testing is packaged and made available to science and educational groups spanning these demographics, e.g., by web access on the SAT/SYS Server through an education-themed portal. Using this approach allows for expanded satellite access for a relatively small investment. For this market, the system is enhanced through educational videos, tutorials and discussion forums to increase the familiarity of the potential users with the satellite payload options and relevant science, math, technology and engineering subjects. Lastly, this might be further augmented with local and global competition to further drive engagement and innovation by the target market audience.

Additional major markets for satellite images and data collected by the above described constellation of satellites with rapidly improving components are in the weather, climate, agriculture and disaster monitoring and disaster recovery industries. In particular spatially and temporally synchronized data and images with optional add-on analytics on top of the raw-data are of high value with many potential uses and customers.

Similarly, spatially and temporally synchronized satellite collected data and images are of significant value for the financial services industry (asset managers, banks, insurance). This data is used in assessing the type and amount of local or global economic activity and thus supports investment decision-making.

The foregoing arrangements for the SAT/SYS Server 130 of FIG. 3 can be found in the functional block diagram of FIG. 4. In particular, the Server includes an Interface 410 that creates the working environment for web users connected by the Internet. System data, user account data, satellite data and other digital information is stored in the database 430. Continuing along the bottom row, communications control to and from the orbiting satellite, including any real time feed or current imaging for display on the landing page of the web site is managed by the Comm Controls 440. Overall operations are governed by the Operations module 460 including both ground and orbiting commands.

Continuing with FIG. 4, the application library is depicted by block 420 and provides user access to one or more programs that may be used in conjunction with experiments or testing during satellite access time. Block 450 depicts the auction or trading site for access time allocations and transfers. The education module is shown at block 470 and includes various education packages for user review. Block 480 provides the governing controls for site access including subscription management, security and privacy.

Satellite communication and control is delivered by ground station resources embraced by block 330 of FIG. 3. This arrangement is described with more detail in FIG. 5 and includes both the Ground Station Control Box 510 and the Ground Station Computer 560. The Control Box is moveably mounted and includes a Motor Microprocessor and Motor Controller. Incoming control signals to router are directed to the Motor Microprocessor. These control signals are translated to a control output signal and directed to the Motor Controller for operations of Elevation Motor 540 and Azumith Motor 550.

Figure 5:
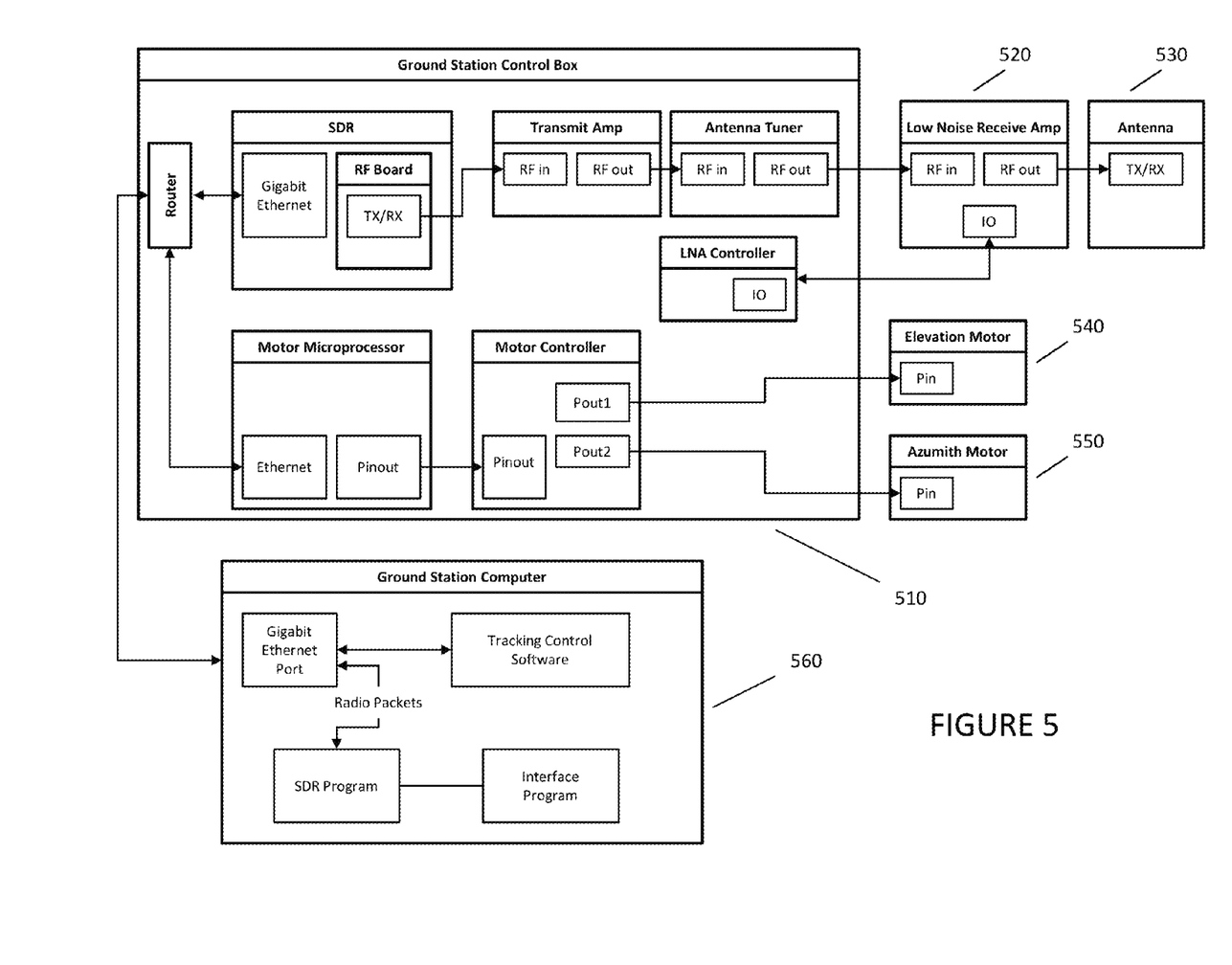
FIG. 5 is a functional block diagram of an illustrated ground control station.

Communication is controlled by SDR connected to the router. Processing on the RF board results in output signals to the Transmit Amp and Tuner for figuring band adjustment. Ground Antenna 530 receives the adjusted low noise signal for the Amp 520 controlled by the LNA controller. Communication to and from the satellites are sent and collected by Antenna 530.

Persons skilled in the art will recognize that the foregoing discussion is for illustration and does not by itself limit the claims. In particular, skilled artisans will recognized that there are current and future variations of the above arrangements that are consistent with the invention, and that the proper scope of the invention is provided by the following individual claims unencumbered by the discussion of these illustrative examples provided above.

The invention claimed is:

1. A system comprising:
   an in-orbit satellite;
   an earth transceiver in communication with the in-orbit satellite;
   a server in communication with the in-orbit satellite via the earth transceiver, the server storing information of time slots allocated to a plurality of users to access real-time information of the satellite, the server is configured to:

receive a user's request, via a user interface, to access the satellite during the user's allocated time slot;

receive real-time information of the satellite from the satellite via the earth transceiver during the user's allocated time slot; and output, to the user, via the user interface, the received real-time information of the satellite during the user's allocated time slot;

wherein the server stores information of a first time slot allocated to a first user to access real-time information of the satellite and stores information of a second time slot allocated to a second user to access real-time information of the satellite, and wherein the server is configured to:

receive the first user's request to access the satellite during the first time slot;

receive real-time information of the satellite from the satellite via the earth transceiver during the first time slot;

output to the first user the received real-time information of the satellite during the first time slot;

receive the second user's request to access the satellite during the second time slot;

receive real-time information of the satellite from the satellite via the earth transceiver during the second time slot; and output to the second user the received real-time information of the satellite during the second time slot.

2. The system of claim 1, wherein the real-time information of the satellite includes images captured by the satellite.

3. The system of claim 1, wherein the real-time information of the satellite includes measurements taken by the satellite.

4. The system of claim 1, wherein the real-time information of the satellite includes information determined by the satellite.

5. A system comprising:

an in-orbit satellite;

an earth transceiver;

a server in communication with the satellite via the earth transceiver, the server storing a plurality of time slots purchased by users for operating the satellite, the server configured to:

receive an application from a user via a user interface;

output the application to the satellite via the earth transceiver for execution of the application by the satellite at the user's purchased time slot;

receive from the satellite via the earth transceiver data representing a result of the execution; and output the received data to the user;

wherein the server stores a first time slot purchased by a first user for operating the satellite and a second time slot purchased by a second user for operating the satellite, and the server is configured to:

receive a first application from the first user;

output the first application to the satellite via the earth transceiver for execution of the first application by the satellite at the first time slot;

receive from the satellite via the earth transceiver data representing a result of the execution of the first application;

output the received data representing the result of the execution of the first application to the first user;

receive a second application from the second user;

output the second application to the satellite via the earth transceiver for execution of the second application by the satellite at the second time slot;

receive from the satellite via the earth transceiver data representing a result of the execution of the second application; and output the received data representing the result of the execution of the second application to the second user.

* * * * *